«12» United States Patent
Liu

(10) Patent No.: US 10,333,892 B2
(45) Date of Patent: Jun. 25, 2019

(54) NETWORK COMMUNICATION SYSTEM AND NETWORK-TRAVERSAL METHOD

(71) Applicants: ThroughTek Technology (ShenZhen) Co., Ltd., Shenzhen (CN); ThroughTek Co., Ltd., Taipei (TW)

(72) Inventor: Kai-Kuo Liu, Taipei (TW)

(73) Assignees: THROUGHTEK TECHNOLOGY (SHENZHEN) CO., LTD., Shenzhen (CN); THROUGHTEK CO., LTD., Taipei (TW)

( * ) Notice: Subject to any disclaimer, the term of this patent is extended or adjusted under 35 U.S.C. 154(b) by 96 days.

(21) Appl. No.: 15/482,414

(22) Filed: Apr. 7, 2017

(65) Prior Publication Data

US 2017/0295135 A1   Oct. 12, 2017

(30) Foreign Application Priority Data

Apr. 7, 2016   (TW) .............................. 105110969 A

(51) Int. Cl.
*H04L 29/12*   (2006.01)
*H04L 12/741*   (2013.01)
*H04L 12/935*   (2013.01)

(52) U.S. Cl.
CPC ........ *H04L 61/256* (2013.01); *H04L 61/2514* (2013.01); *H04L 61/2567* (2013.01); *H04L 61/2582* (2013.01); *H04L 45/74* (2013.01); *H04L 49/30* (2013.01)

(58) Field of Classification Search
CPC .............. H04L 61/256; H04L 61/2514; H04L 61/2567
See application file for complete search history.

(56) References Cited

U.S. PATENT DOCUMENTS

2006/0182100 A1* 8/2006 Li ..................... H04L 29/12009
370/389
2006/0291452 A1* 12/2006 Velagaleti ............. H04L 1/1671
370/352

OTHER PUBLICATIONS

M. Boucadair, Huawei Port Range Configuration Options for PPP IP Control Protocol (IPCP) (RFC6431), Nov. 1, 2011.*

* cited by examiner

*Primary Examiner* — Zhensheng Zhang
(74) *Attorney, Agent, or Firm* — Muncy, Geissler, Olds & Lowe, P.C.

(57) ABSTRACT

A network-traversal method includes: receiving an address information of a network device from a link server; generating a port number sequence composed of port values according to an external port number of the address information; and sending a link packet to an external network address of the address information in an order of the port values in the port number sequence until receiving an acknowledgement packet from the network device. At least one of the port values is related to the external port number. A part of the rest port values is/are generated gradually based on the external port number, and the others of the rest port values is/are generated randomly.

18 Claims, 9 Drawing Sheets

NETWORK COMMUNICATION SYSTEM AND NETWORK-TRAVERSAL METHOD

CROSS-REFERENCE TO RELATED APPLICATION

This non-provisional application claims priority under 35 U.S.C. § 119(a) to Patent Application No. 105110969 filed in Taiwan, R.O.C. on Apr. 7, 2016, the entire contents of which are hereby incorporated by reference.

BACKGROUND

Technical Field

The present invention is related to a traversal technology of network address translator, especially to a network communication system and a network-traversal method.

Related Art

As Internet has developed dramatically, more and more Internet Protocol (IP) addresses of network devices have been used. Consequently, the network address translator (NAT) is used to retard the problem of insufficient address spaces for IPv4 (Internet Protocol version 4).

The NAT may translate the IP header so as to allow the same one IP address being used for more than one network device to connect to the Internet. The NAT uses only one external IP address (i.e. public IP address) for the Internet, but uses one or more internal addresses (i.e. private IP address) for local network. Thus, all network devices in the local network can be connected to the Internet via only few public IP addresses.

It is very common to use peer-to-peer (P2P) technology when the network devices are connected to each other. When two network devices are located in the different local networks behind two different NATs, the two network devices cannot traverse the NATs to be connected to each other because the two different NATs will shield the two local networks behind them from the Internet.

SUMMARY

In one embodiment, a network communication system includes a first network device, a second network device, a link server, a first address translator, and a second address translator. The first address translator is configured to form a first local network. The first network device is located in the first local network. The second address translator is configured to form the second local network. The second network device is located in the second local network. The link server is located in the Internet.

The first address translator includes a first internal port and at least a first external port. The first internal port is connected to the Internet via one of the first external port(s). The first address translator has a first external network address, and each first external port has a first external port number.

The second address translator includes a second internal port and a plurality of the second external port. The second internal port is connected to the Internet via one of the second external ports. The second address translator has a second external network address, and each second external port has a second external port number.

The first network device is coupled to the first internal port. The second network device is coupled to the second internal port. The first network device is connected to one of the first external ports via the first internal port and connected to the link server via the first external port. The second network device is connected to one of the second external ports via the second internal port and connected to the link server via the second external port.

When the first network device is connected to the link server via the first external port, the link server stores the first external network address and the first external port number corresponding to the first external port. When the second network device is connected to the link server via the second external port, the link server stores the second external network address corresponding to the second network device and the second external port number corresponding to the second external port.

When the first network device obtains the second external network address and the second external port number from the link server, the first network device generates a port number sequence with a plurality of port value according to the second external port number. The first network device sends a first link packet to the second external network address according to an order of the port values in the port number sequence until the first network device receives a first acknowledgement packet from the second network device, resulting from the second network device receives the first link packet via at least one of the plurality of second external ports.

At least one of the port values is related to the second external port number, a part of the port values is/are generated gradually based on the second external port number, and the rest is/are generated randomly.

In one embodiment, a network-traversal method comprises: obtaining an address information of a network device from a link server; generating a port number sequence with a plurality of port value based on an external port number in the address information; and sending a link packet to an external network address in the address information in an order of the port values in the port number sequence until receiving a acknowledgement packet from the network device. One port value in the port number sequence is the second external port number, a part of the port values is/are generated gradually based on the second external port number, and the rest is/are generated randomly.

In summary, according to the embodiments, the network communication system and the network-traversal method is adapted to generate gradually a first part of the port values in a port number sequence and generate randomly a second part of the port values in the port number sequence based on an external port number obtained initially, and then send a link packet to the external ports corresponding the port values in the port number sequence in order, thereby accelerating the link connection to the target.

DETAILED DESCRIPTION

Figure 1:
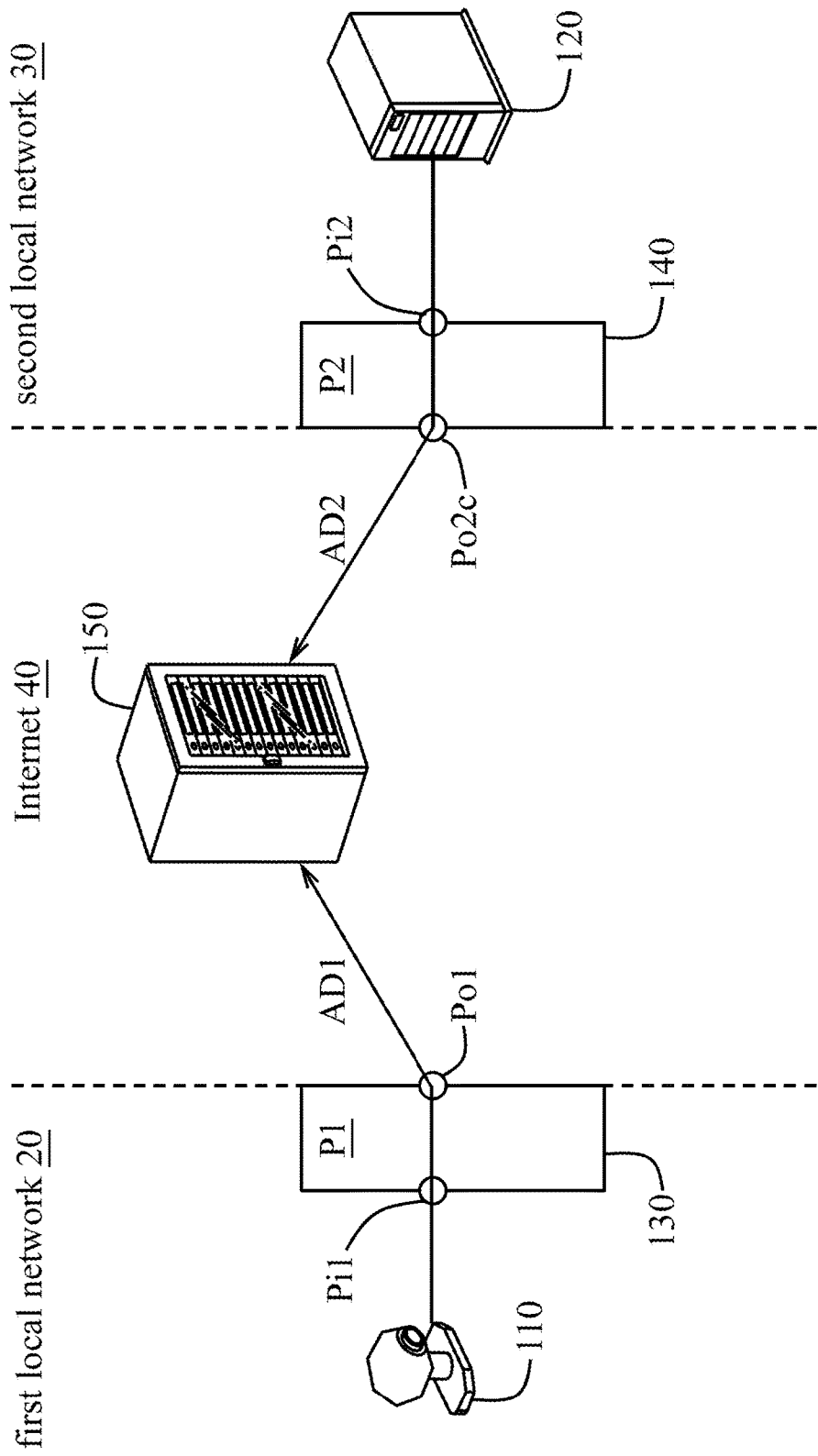
FIG. 1 is a schematic diagram showing the first embodiment for a network communication system in the first operation scenario of the instant disclosure.

FIG. 1 is a schematic diagram showing the first embodiment for a network communication system in the first operation scenario of the instant disclosure. Please refer to FIG. 1. The network communication system includes two network devices (below called and referred respectively to the first network device 110 and the second network device 120), two address translators (below called and referred respectively to the first address translator 130 and the second address translator 140), and a link server 150.

The first address translator 130 is used to form a local network (below called and referred to the first local network 20), and the second address translator 140 is used to form another local network (below called and referred to the second local network 30). The link server 150 is located in the Internet 40. The first network device 110 and the first address translator 130 are located in the first local network 20. The first network device 110 is located behind the first address translator 130 (the relative position of the Internet 40). In other words, the first network device 110 is coupled to the first address translator 130 and connected to the Internet 40 via the first address translator 130. The second network device 120 and the second address translator 140 are located in the second local network 30. The second network device 120 is located behind the second address translator 140 (relative position of the Internet 40). In other words, the second network device 120 is coupled to the second address translator 140 and connected to the Internet 40 via the second address translator 140.

Figure 2:
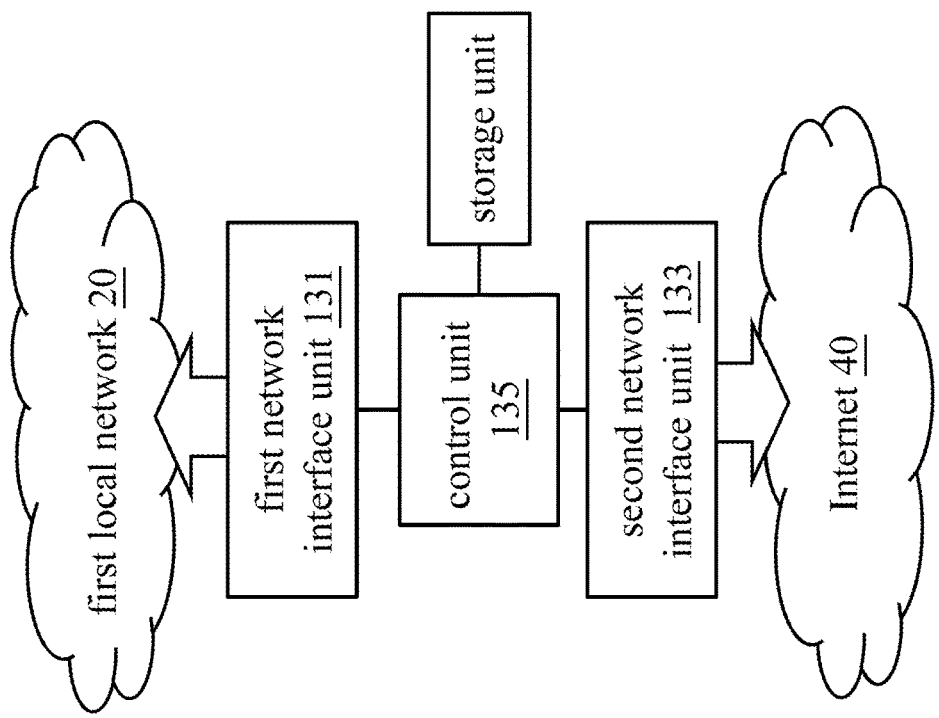
FIG. 2 is a schematic diagram showing the first address translator in FIG. 1.

FIG. 2 is a schematic diagram showing the first address translator 130 in FIG. 1. In some embodiments, referring to FIG. 1 and FIG. 2, the first address translator 130 includes two network interface units (below called and referred to the first network interface unit 131 and the second network interface unit 133) and a control unit 135. The control unit 135 is coupled to and between the first network interface unit 131 and the second network interface unit 133. The first network interface unit 131 is connected to the first local network 20, and the second network interface unit 133 is connected to the Internet 40. The first network interface unit 131 includes one or more internal ports (below called and referred to the first internal port Pi1, as shown in FIG. 1). One first internal port Pi1 of the first network interface unit 131 is coupled to the first network device 110 located in the first local network 20, as shown in FIG. 1. The second network interface unit 133 includes one or more external ports (below called and referred to the first external port Po1, as shown in FIG. 1). The first internal port Pi1 is connected to one of the first external ports Po1 and connected to the Internet 40 via the first external port Po1, so as to allow the first network device 110 to connect with the Internet 40 via the first address translator 130. The first address translator 130 includes an external network address (below called and referred to the first external network address P1). Each first external port Po1 includes respectively an external port number (below called and referred to the first external port number). In some embodiments, the control unit 135 is capable of altering for address. When uploading is required for transmission, the control unit 135 alters the address information of the first internal port Pi1 to the address information of the corresponding first external port Po1. That is, the internal port number of the first internal port Pi1 is altered to the first external port number of the first external port Po1 connected to the first internal port Pi1. Accordingly, the packet received by the network device located in the first local network 20 may be redirected to the Internet 40. When downloading is required for transmission, the control unit 135 alters the address information of the first external port Po1 to the address information of the corresponding first internal port Pi1. That is, the first external port number of the first external port Po1 is altered to the internal port number of the first internal port Pi1 connected to the first external port Po1. Accordingly, the packet received from the Internet 40 may be redirected to the network device located in the first local network 20. In other words, the control unit 135 is capable of connecting each first internal port Pi1 to one corresponding first external port Po1.

Figure 3:
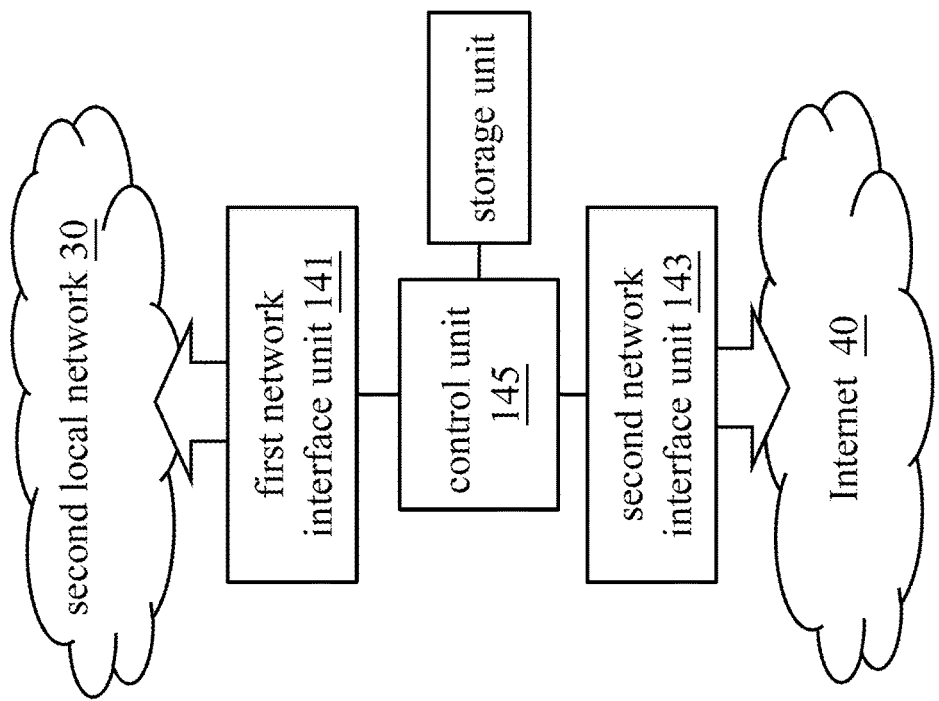
FIG. 3 is a schematic diagram showing the second address translator in FIG. 1.
Figure 6:
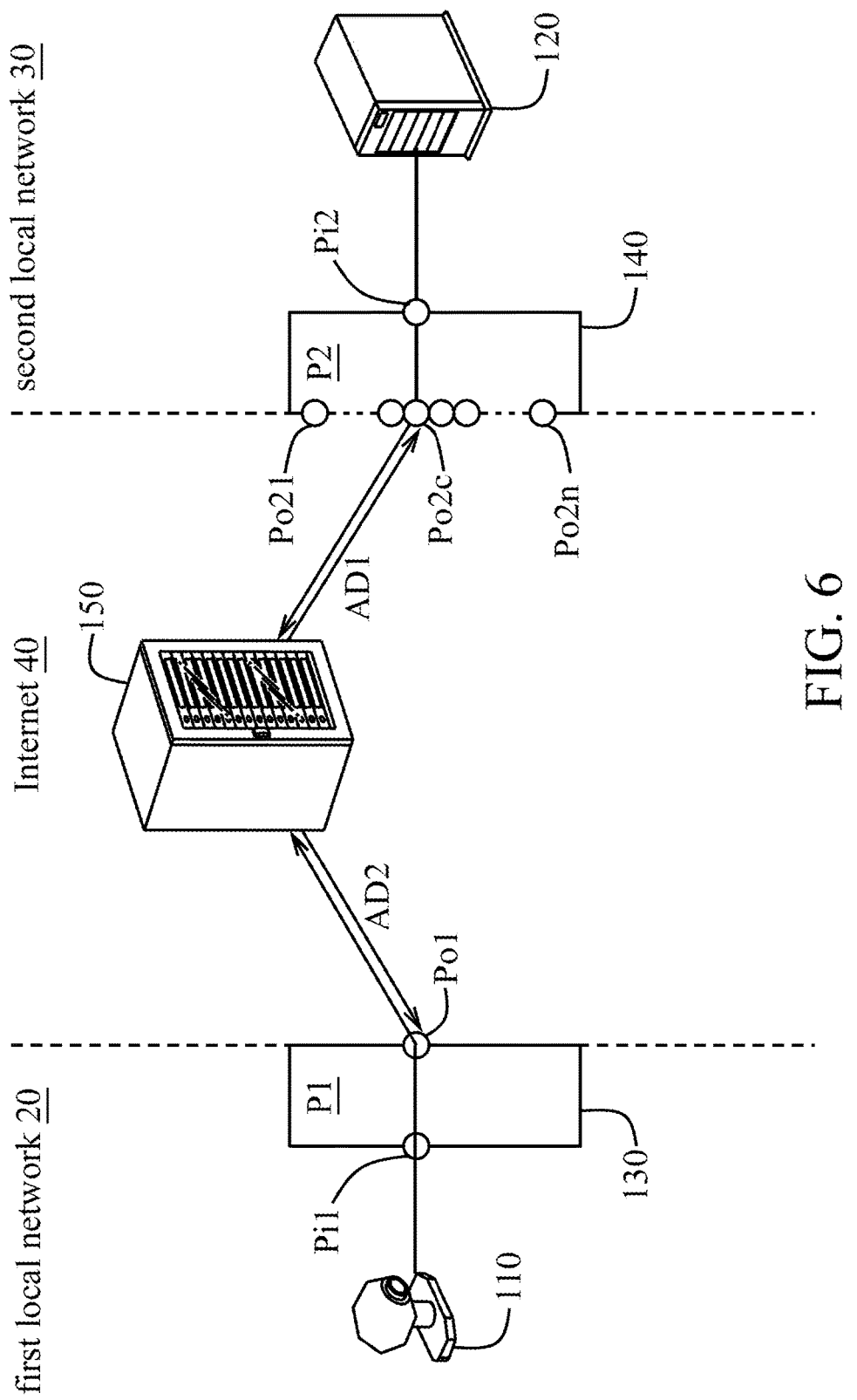
FIG. 6 is a schematic diagram showing the network communication system in the second operation scenario of FIG. 1.

FIG. 3 is a schematic diagram showing the second address translator 40 in FIG. 1. In some embodiments, referring to FIG. 1 and FIG. 3, the second address translator 140 includes two network interface units (below called and referred to the first network interface unit 141 and the second network interface unit 143) and a control unit 145. The control unit 145 is coupled to and between the first network interface unit 141 and the second network interface unit 143. The first network interface unit 141 is connected to the second local network 30, and the second network interface unit 143 is connected to the Internet 40. The first network interface unit 141 includes one or more internal ports (below called and referred to the second internal port Pi2, as shown in FIG. 1). One second internal port Pi2 of the first network interface unit 141 is coupled to the second network device 120 located in the second local network 30, as shown in FIG. 1. The second network interface unit 143 includes one or more external ports (below called and referred to the second external port Po21 to Po2n, as shown in FIG. 1 and FIG. 6). The second internal port Pi2 is connected to one second external port Po2c and connected to the Internet via the second external port Po2c, so as to allow the second network device 120 to connect with the Internet 40 via the second address translator 140. The second address translator 140 includes an external network address (below called and referred to the second external network address P2). Each second external port Po21 to Po2n includes respectively an external port number (below called and referred to the second external port number).

In some embodiments, the control unit 145 is capable of altering for address. When uploading is required for transmission, the control unit 145 alters the address information of the second internal port Pi2 to the address information of the corresponding second external port Po2c. That is, the internal port number of the second internal port Pi2 is altered to the second external port number of the second external port Po2c connected to the second internal port Pi2. Accordingly, the packet received by the network device located in the first local network 20 is redirected to the Internet 40. When downloading is required for transmission, the control unit 145 alters the address information of the second external port Po2c to the address information of the corresponding second internal port Pi2. That is, the second external port number of the second external port Po2 is altered to the internal port number of the second internal port Pi2 connected to the second external port Po2. Accordingly, the packet received from the Internet 40 may be redirected to the network device located in the second local network 30. In other words, the control unit 135 is capable of connecting each second internal port Pi2 to one corresponding second external port Po2c.

In some embodiments, at least one of the two address translators (i.e. the first address translator 130 and the second address translator 140) is a symmetric network address translator (NAT). When the target destination uses the symmetric NAT, the address translator of the source end may adopt any network-traversal method in accordance with the present disclosure to connect to the Internet. It takes a second-type NAT and a symmetric NAT as an example in below. For example, the first address translator 130 is the second-type NAT (such as a port restricted cone NAT) and the second address translator 140 is the symmetric NAT, which are not used to limit the present invention. In practice, for other embodiments, the two address translator may both be the symmetric NAT or the like.

In some embodiments, the link server 150 stores the address information (below called and referred to the first address information AD1) of the first network device 110 and the address information (below called and referred to the second address information AD2) of the second network device 120. In some embodiments, the address information of each network device may be provided to the link server 150 for storing into storage unit thereof from a link packet. For example, when the first network device 110 sends a link packet to the link server 150 via the first address translator 130, the link server 150 may obtain the first address information AD1 of the first network device 110 from the link packet for storing into the storage unit. When the second network device 120 sends a link packet to the link server 150 via the second address translator 140, the link server 150 may obtain the second address information AD2 of the second network device 120 from the link packet for storing into the storage unit. In some embodiments, the first address information AD1 of the first network device 110 and the second address information AD2 of the second network device 120 may be provided to the link server 150 in the same or different process. The process may be a registration process for the network device registering at the link server, an update process (processing periodically after registering) for the network device renewing the address information in the link server, or a link-establishing process for establishing a link connection between two network devices.

The first address information AD1 is the address information of the first external port Po1 corresponding to the first internal port Pi1 coupled to the first network device 110. Furthermore, the first address information AD1 includes the first external network address P1 of the first address translator 130 and a first external port number of the first external port Po1 connected to the first internal port Pi1. The second address information AD2 is the address information of the second external port Po2c corresponding to the second internal port Pi2 coupled to the second network device 120. Furthermore, the second address information AD2 includes the second external network address P2 of the second address translator 140 and a second external port number of the second external port Po2c connected to the second internal port Pi2. In other words, the external port number stored in the link server 150 is the port number used for the address translator sending the link packet to the link server 150. The external network address (i.e. the first external network address P1 and the second external network address P2) may be, for example, but not limited to, the Internet Protocol (IP) address.

Figure 4:
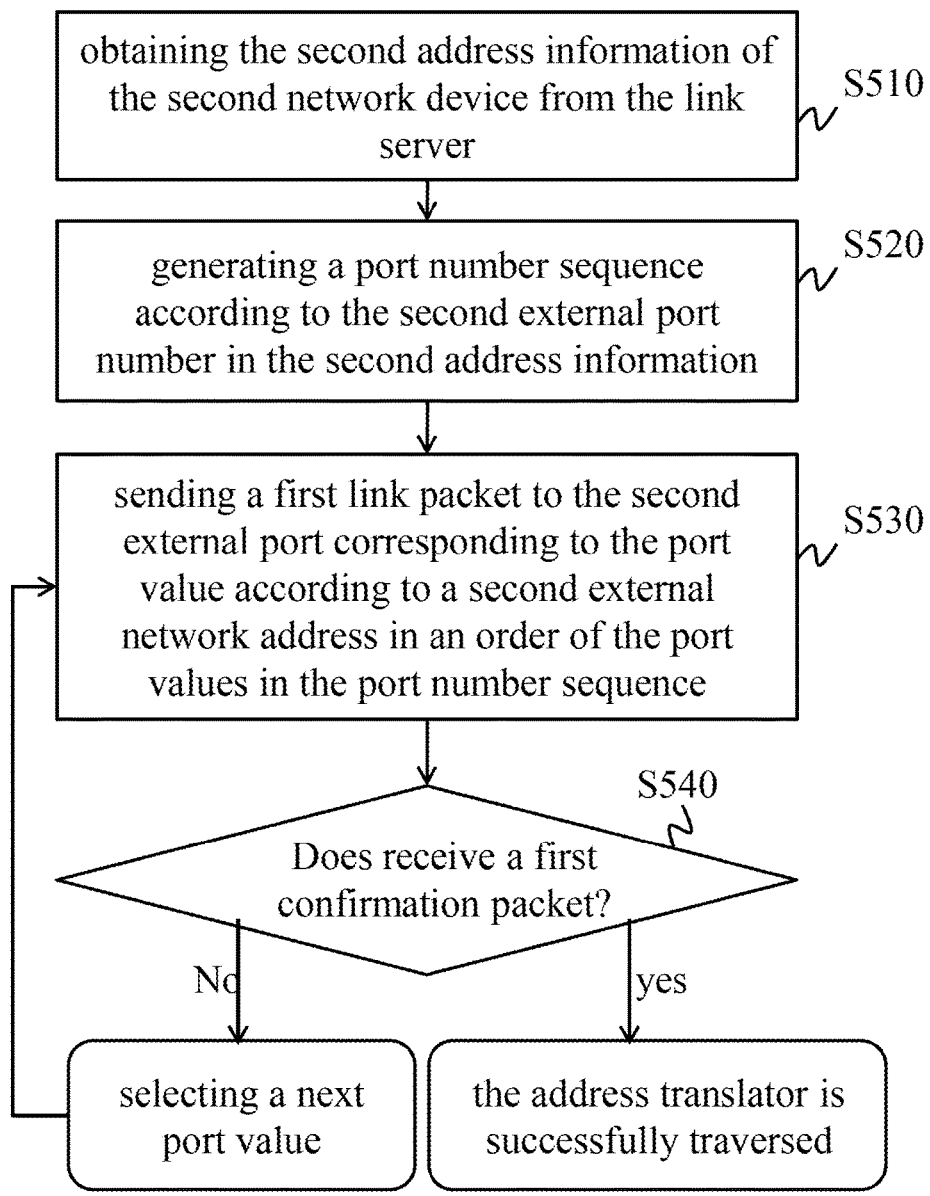
FIG. 4 is a method flowchart showing an embodiment for a network-traversal method of the instant disclosure.
Figure 5:
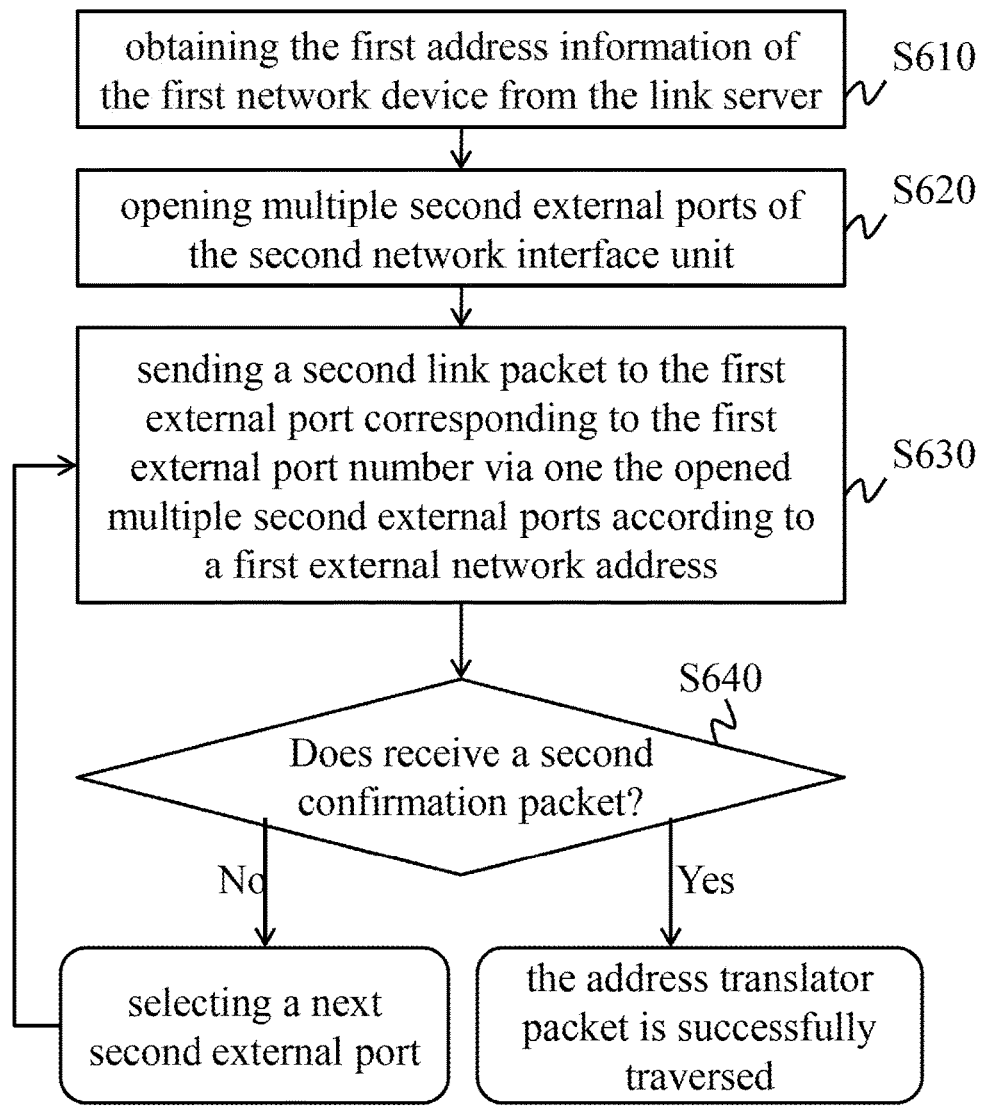
FIG. 5 is another method flowchart showing another embodiment for a network-traversal method of the instant disclosure.

FIG. 4 is a method flowchart showing an embodiment for a network-traversal method of the instant disclosure. FIG. 5 is another method flowchart showing another embodiment for a network-traversal method of the instant disclosure.

Please refer to FIG. 2 to FIG. 5. When the first network device 110 and the second network device 120 wants to link with each other, the network communication system proceeds with a establishing process for establishing the link connection between them.

As shown in FIG. 6, the first network device 110 is communicated with the link server 150 via the first address translator 130. The first network device 110 obtains the second address information AD2 of the second network device 120 from the link server 150 (Step S510 of FIG. 4). As shown in FIG. 6, the second network device 120 is communicated with the link server 150 via the second address translator 140. The second network device 120 obtains the first address information AD1 of the first network device 110 from the link server 150 (Step S610 of FIG. 5). After obtaining the first address information AD1, the second network device 120 controls the control unit 145 of the second address translator 140 to open multiple second external ports Po21 to-Po2n of the second network interface unit 143 (the number of the ports to be opened is not used to limit the present invention, which may open all ports or part of the ports), as shown in Step S620 of FIG. 5.

In some embodiments, after obtaining the second address information AD2, the first network device 110 generates a port number sequence based on the second external port number "c" in the second address information AD2. For example, the second external port number in the second address information AD2 is "c". The port number sequence includes multiple port values (V1 to Vm) in order. One of the port values (V1 to Vm) is the second external port number "c", a part of the rest of the port values is/are generated gradually based on the second external port number "c", and the other of the rest of the port values is/are generated randomly.

In some embodiments, the port values generated gradually and the port values generated randomly are arranged by a particular rule, such as one generated gradually following one generated randomly, two generated gradually following two generated randomly, one generated gradually following two generated randomly, or two generated gradually following one generated randomly, etc.

In some embodiments, among the port values V1 to Vm, the first one (i.e. the first port value V1) is the second external port number "c". Except the first port value V1, a part of the port values V2 to Vm in the port number sequence is/are generated gradually based on the first port value V1, and the other of the port values V2 to Vm, i.e. the rest port value(s), is/are generated randomly. In some embodiments, the total number "m" of the port values is less than the number of request times for determining the link connection belongs to cyber attacks, such as more than 2048. Preferably, "m" is between 912 and 1024. The "c" and "m" both are positive integers.

In some embodiments, the total number of the port values generated randomly is larger than or equal to a quarter of the total number "m" of all the port value. For example, in the port number sequence, the (4k+3)th port value V4k+3 and the (4k+4)th port value V4k+4 both are generated randomly, wherein the "k" is an integer less than m/4 but not less than 0 (zero). For the convenience of description, it takes m=16 as the example below. In the port number sequence, at least the port values V3, V4, V7, V8, V11, V12, V15, and V16 are generated randomly, for example.

In some embodiments, the port values generated gradually may be generated incrementing gradually or decrementing gradually. For example, in the port number sequence, the (4k+5)th port value V4k+5 is generated incrementing gradually, and the (4k+2)th port value V4k+2 is generated decrementing gradually; wherein the "k" is an integer less than m/4 but not less than 0 (zero). For the convenience of description, it takes m=16 as the example below. In the port number sequence, at least the port values V5, V9, and V13 are generated increasingly, and at least the port values V2, V6, V10, and V14 are generated decreasingly. Alternatively, the (4k+5)th port value V4k+5 is generated decreasingly, and the (4k+2)th port value V4k+2 is generated increasingly. It takes m=16 as the example. In the port number sequence, at least the port values V5, V9, and V13 are generated decreasingly, and at least the port values V2, V6, V10, and V14 are generated increasingly.

In some embodiments, the gradual increment or decrement may be 1, 2, 3 or any positive integer. For example, if 1 (one) is chosen, the (4k+5)th port value V4k+5 is generated by gradually increasing, and the (4k+2)th port value V4k+2 is generated by gradually decreasing. For the convenience of description, it takes m=16 as the example below. The port values V1, V2, V5, V6, V9, V10, V13, and V14 generated by the first network device 110 are respectively c, c−1, c+1, c−2, c+2, c−3, c+3, and c−4.

In some embodiments, in the port number sequence, each port value is between 1024 and 65535. In other words, when a port value is generated randomly, the first network device 110 chooses a value randomly from the unassigned values between 1024 and 65535. "The unassigned value" means the value is not the generated port values.

In some embodiments, when the gradually generated port value(s) (such as Vi) is/are less than 1024 or bigger than 65535, the first network device 110 regenerates the port value (Vi) randomly; wherein the "i" is a positive integer.

In some embodiments, when the gradually generated port value(s) (such as Vi) is/are same as the randomly generated port value(s) (such as V2 to Vi−1), the first network device 110 regenerates the port value (Vi) randomly or regenerates the port value (Vi) by further adding or reducing the value based on the original generated port value Vi.

In some embodiments, the first network device 110 may generate in order each port value in the port number sequence. The order may be, for example, that the first network device 110 may first assign (or generate) one port value by gradual for the port number sequence, and then assign (or generate) one port value randomly for the port number sequence.

Figure 7:
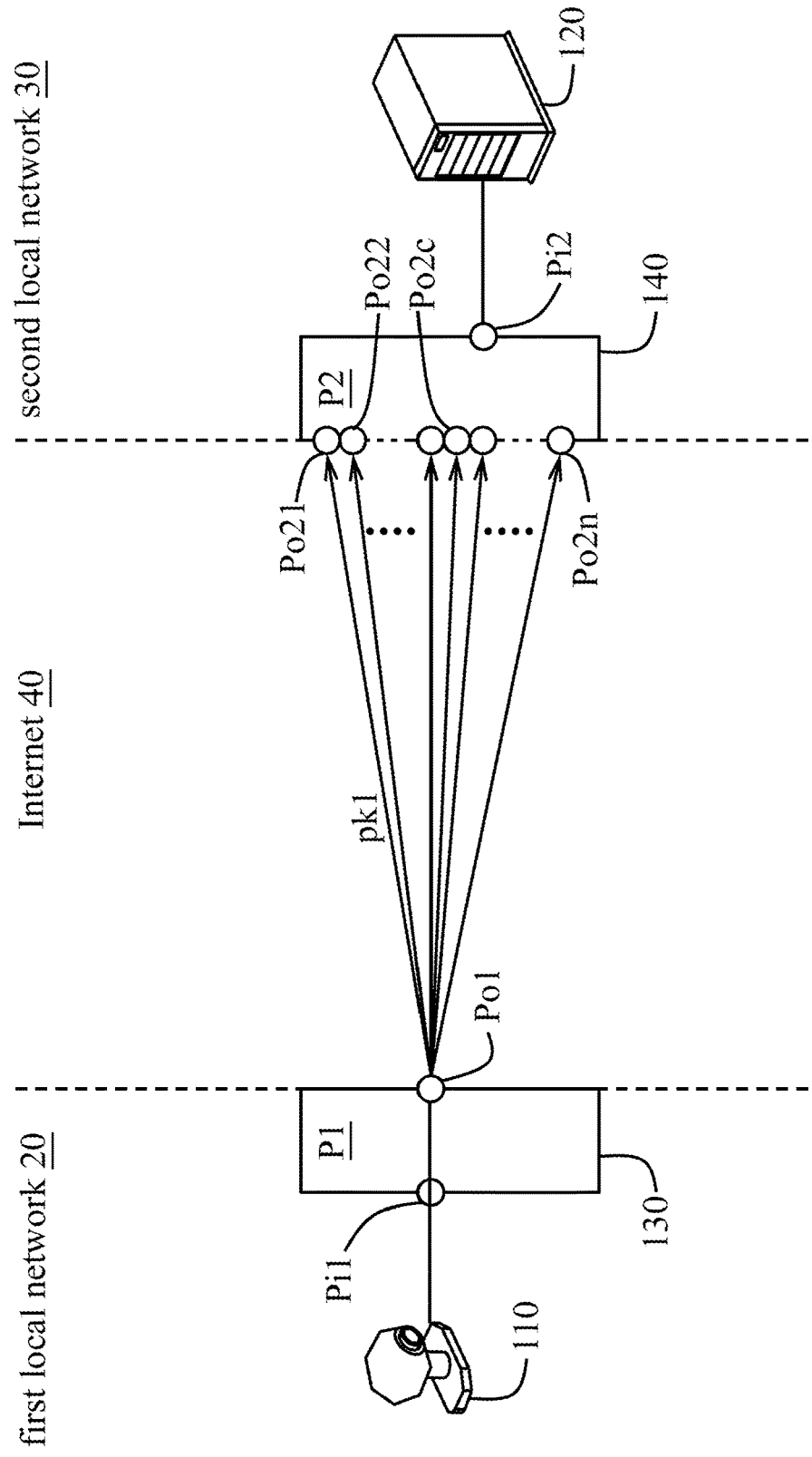
FIG. 7 is a schematic diagram showing the network communication system in the third operation scenario of FIG. 1.

After the port number sequence (i.e. the port values V1 to Vm) is generated, the first network device 110 continuously sends a link packet (below called and referred to the first link packet pk1, as shown in FIG. 7) to the second external ports Po21 to Po2n of the second address translator 140 respectively corresponding to the port values V1 to Vm through the first address translator 130 according to the second external network address P2 in the second address information AD2 in the order of the port values V1 to Vm in the port number sequence until the first network device 110 receives the acknowledgement packet (below called and referred to the first acknowledgement packet ACK1) returned from the link address and the corresponding port value of the second network device 120.

For example, according to the second external network address P2, the first network device 110 first sends a first link packet pk1 to the second external port Po21 that is corresponding to the port value V1 (representing the position of the second external port Po21) through the first address translator 130, as shown in Step S530 of FIG. 4. Afterwards, the first network device 110 detects for the first acknowledgement packet ACK1 returned from the second external port Po21, as shown in Step S540 of FIG. 4. That is, the first acknowledgement packet ACK1 from the second network device 120 is received. When the first link packet pk1 is received and the second internal port Pi2 of the first network interface unit 141 connecting to the second network device 120 is not mapping to the second external port Po21, the second network device 120 will not receive the first link packet pk1. Consequently, the corresponded first link packet pk1 will not be generated, and the second external port Po21 will not return the first link packet pk1 back to the first external port Po1. That is, the first network device 110 will not receive the first acknowledgement packet ACK1 from the second network device 120. If the first network device 110 does not receive the returned first acknowledgement packet ACK1 within a specific time after sending the link packet, the first network device 110 will select a next port value V2 and send the first link packet pk1 to the second external port Po22 that is corresponding to the port value V2 (representing the position of the second external port Po22) through the first address translator 130, as shown in Step S530 of FIG. 4. Afterwards, the first network device 110 detects for the first acknowledgement packet ACK1 returned from the second external port Po22, as shown in Step S540 of FIG. 4. Similarly, if the first network device 110 does not receive the returned first acknowledgement packet ACK1 within a specific time after sending the link packet, the first network device 110 will select a next port value V3 and continue the sending step (Step S530) and the detecting step (Step S540), until the first network device 110 receives the first acknowledgement packet ACK1 from the second network device 120.

Figure 8:
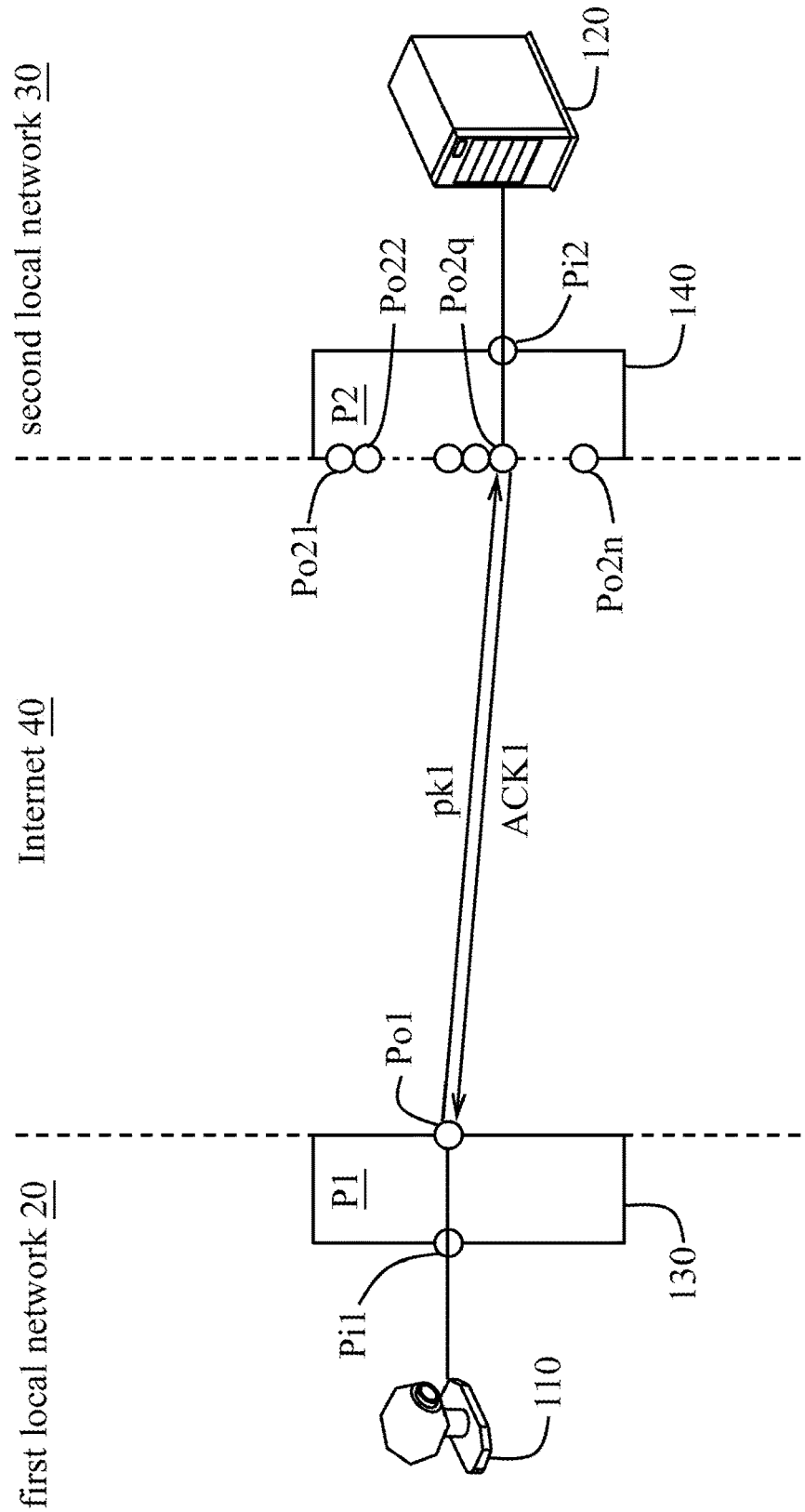
FIG. 8 is a schematic diagram showing the network communication system in the fourth operation scenario of FIG. 1.

For example, when a port value Vq is selected, the first network device 110 sends the first link packet pk1 to the second external port Po2q corresponding to the port value Vq (which means the position of the second external port Po2q), as shown in FIG. 8 and Step S530 of FIG. 5. After sending the first link packet pk1, first network device 110 detects that if the first acknowledgement packet ACK1 is returned from the second external port Po2q (Step S540). Please see FIG. 8. When the second address translator 140 receives the first link packet pk1, the internal port Pi2 of the first network interface unit 141 connected to the second network device 120 is mapping to the second external port Po2q. The second network device 120 may receive the first link packet pk1 and generate the first acknowledgement packet ACK1 according to the first link packet pk1. Further, the first acknowledgement packet ACK1 is returned back to the first external port Po1 through the second address translator 140. The control unit 135 of the first address translator 130 forwards the received first acknowledgement packet ACK1 to the first network device 110 via the first internal port Pi1 corresponding to the first external port Po1. Consequently, the first network device 110 receives the first acknowledgement packet ACK1 within a specific time after sending the first link packet pk1, representing the address translator is successfully traversed. After that, a next port value (V(q+1)) is selected and continues for subsequent steps.

Figure 9:
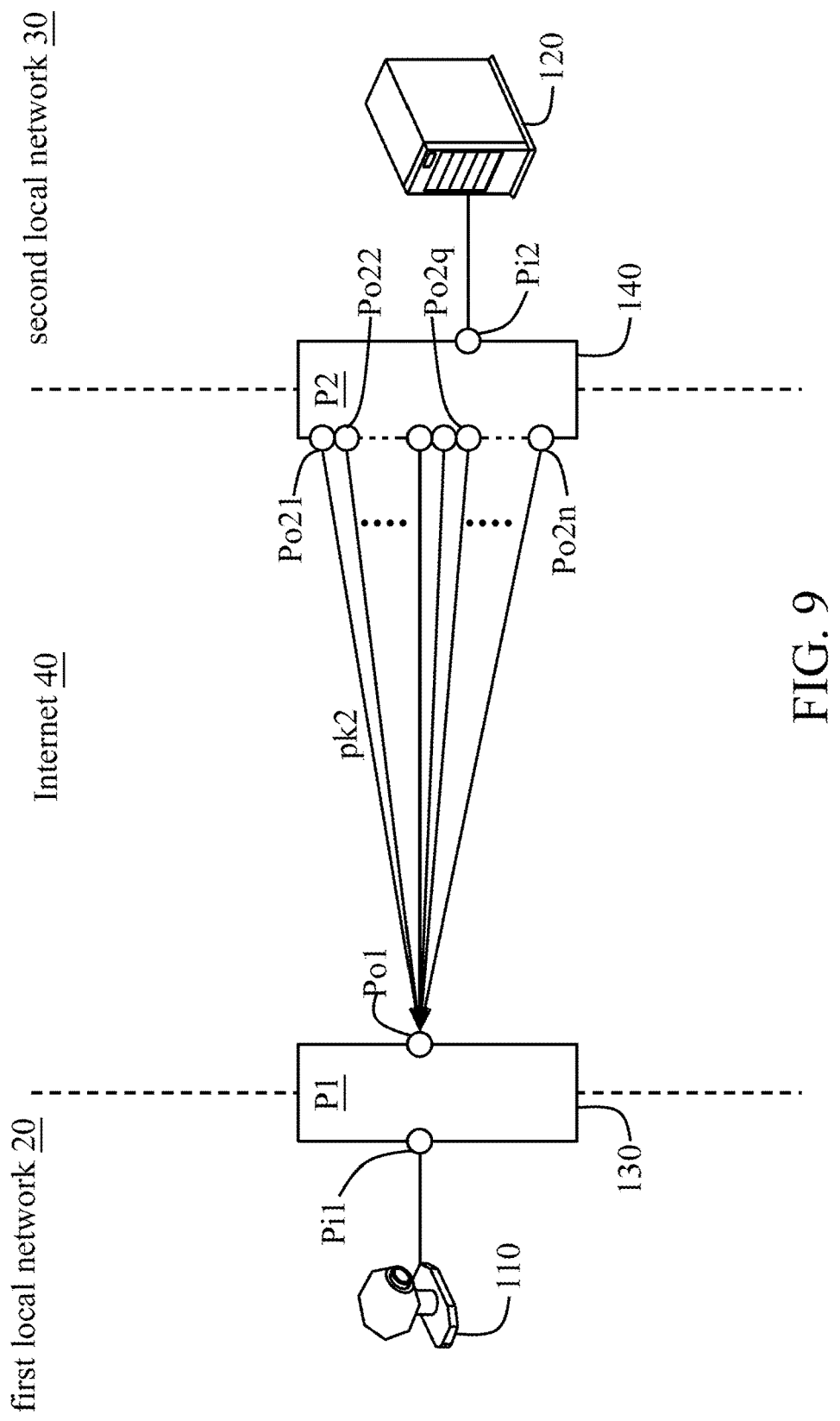
FIG. 9 is a schematic diagram showing the network communication system in the fifth operation scenario of FIG. 1.

In some embodiments, after opening the multiple of the second external ports Po21 to Po2n, the second network device 120 sends a link packet (below called and referred to the second link packet pk2, as shown in FIG. 9) to the first external port Po1 corresponding to the first external port number (representing the position of the first external port Po1) in the first address information AD1 via the second external ports opened by the second address translator 140 one by one according to the first external network address P1 in the first address information AD1, until the second network device 120 receives an acknowledgement packet (below called and referred to the second acknowledgement packet ACK2) returned from the first address information AD1.

For example, the second network device 120 sends the second link packet pk2 to the first external port Po1 that is corresponding to the first external port number through the second address translator 140 opening the second external port Po21 according to the first external network address P1. After sending the second link packet pk2 within a specific time (such as the time before the change of the second external port Po21 mapped by the second network device 120), the second network device 120 detects if the second acknowledgement packet ACK2 (i.e. second acknowledgement packet ACK2 of the first network device 110) is received from the first external port Po1. If the second acknowledgement packet ACK2 is not received within the specific time, the second network device 120 sends the second link packet pk2 to the first external port Po1 that is corresponding to the first external port number according to the first external network address P1 through the second address translator 140 opening the next second external port Po22, as shown in Step S630. The second network device 120 also detects if the second acknowledgement packet ACK2 from the first network device 110 is received, as shown in Step S640. If the second acknowledgement packet ACK2 is not received within the specific time, the second network device 120 again sends the second link packet pk2 to the first external port Po1 that is corresponding to the first external port number according to the first external network address P1 through the second address translator 140 opening the next second external port Po23, as shown in Step S630, and the detection step is processed (Step S640). And so forth, until the second network device 120 receives the second acknowledgement packet ACK2 from the first network device 110.

Figure 10:
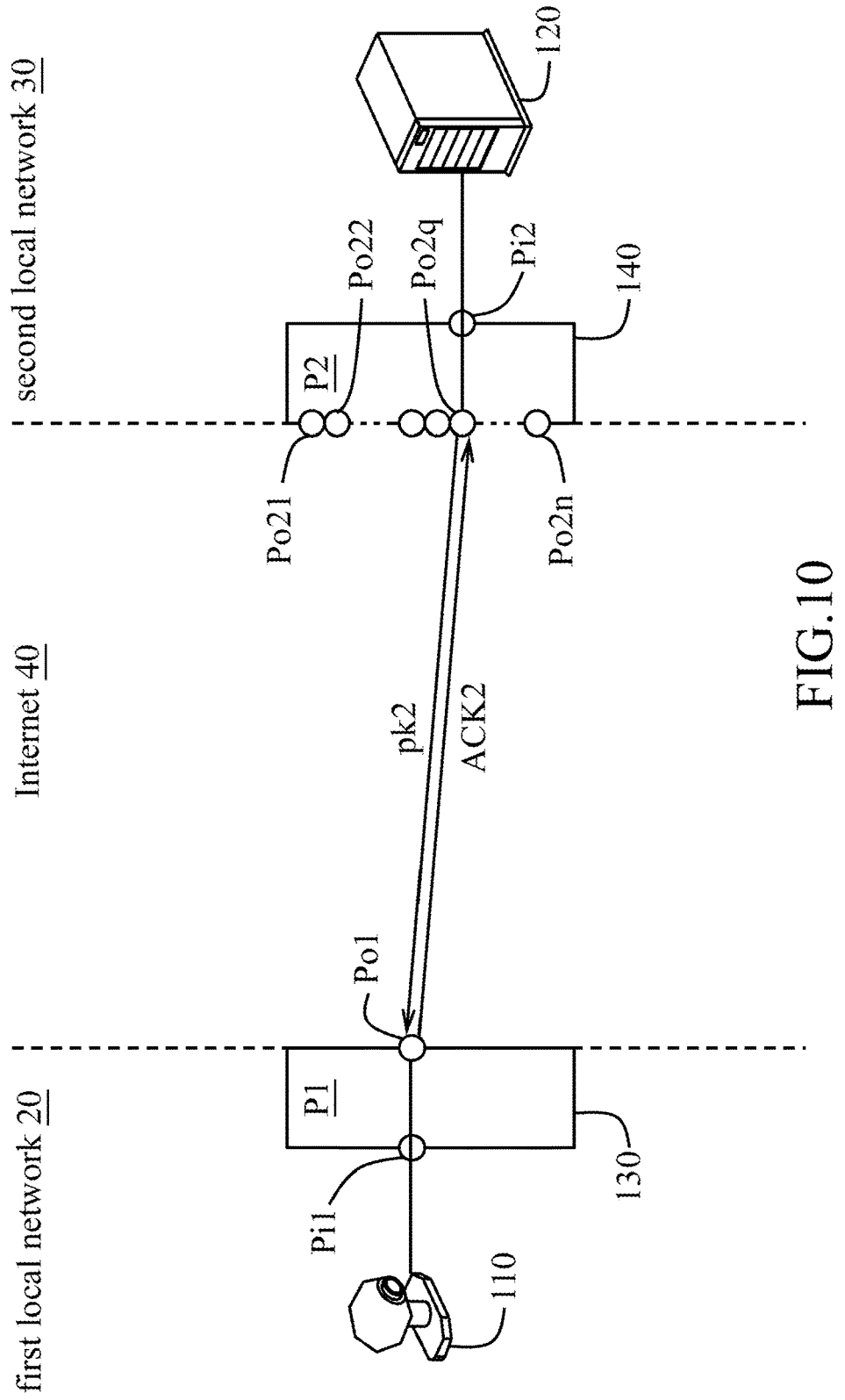
FIG. 10 is a schematic diagram showing the network communication system in the sixth operation scenario of FIG. 1.

For example, when the second external port Po2q is selected, the second network device 120 sends the second link packet pk2 to the first external port Po1 that is corresponding to the first external port number according to the first external network address P1 through the second address translator 140 opening the second external port Po2q (Step S630), as shown in FIG. 10. During the specific time, the second network device 120 detects if the second acknowledgement packet ACK2 is received from the first external port Po1, as shown in Step S640. When the second external port Po2q of the second address translator 140 receives the second acknowledgement packet ACK2 from the first external port Po1, the control unit 145 of the second address translator 140 forwards the received second acknowledgement packet ACK2 to the second network device 120 via the second internal port Pi2 that is corresponding to the second external port Po2q, and so the second network device 120 may receive the second acknowledgement packet ACK2 from the first network device 110 within the specific time. That is, the packet is successfully traversed from the address translator, it stops the step of sending the second link packet pk2 by selecting the next second external port (Po2(q+1)) and the subsequent steps.

In another embodiment, after opening a plurality of the second external port Po21 to-Po2n, the second network device 120 is not limited to the second link packet pk2 sent from the previous second external port having no corresponding second acknowledgement packet ACK2. The second network device 120 sends the second link packet pk2 to the first external port Po1 that is corresponding to the first external port number via opening the second external ports Po21 to-Po2n one by one, until the second network device 120 receives the second acknowledgement packet ACK2 from the first network device 110. In other words, when the second network device 120 sends the second link packet pk2 via other second external port(s), it also detects, at the same time, for the previous used second external port, if the second acknowledgement packet ACK2 is received from the first network device 110. That is, the detecting step may be executed along with any sending step, between any two adjacent sending steps, or any combination.

In another embodiment, after opening the second external ports Po21 to Po2n, the second network device 120 may first send the second link packet pk2 via the opened second external ports Po21 to Po2n one by one, and then the step of detection is continued.

When the first network device 110 receives the first acknowledgement packet ACK1 and the second network device 120 receives the second acknowledgement packet ACK2, the link connection between the first network device 110 and the second network device 120 is successfully established. In some embodiments, the connection between the first network device 110 and the second network device 120 may be a peer to peer connection.

In some embodiments, the above mentioned packet may be complied with the User Datagram Protocol (UDP).

In some embodiments, the above mentioned network device may be Internet connectable devices, such as smart phones, portable navigation deices (PNDs), desktop computers, laptop computers, tablets (or PADs), IP cams, smart home appliances, or the like.

In some embodiments, each storage unit may be stored with relative software/firmware, information, data, and any combination thereof. Each storage unit may be composed of one or more storing devices (such as memories or registers).

In other words, the network-traversal method according to the instant disclosure may be implemented by any computer software products. When a network device is installed with such software, the network device may execute any network-traversal method according to any embodiments of the instant disclosure. In some embodiments, the computer software products may be a computer readable medium, and the above mentioned software may be stored in the computer readable medium so as to allow a computer to read the software and write into the network device. In some embodiments, the above mentioned software may be a computer software product that can be transmitted to the computer or the network device by wired or wireless method.

According to the embodiments, the network communication system and the network-traversal method is adapted to generate gradually a first part of the port values in a port number sequence and generate randomly a second part of the port values in the port number sequence based on an external port number obtained initially, and then send a link packet to the external ports corresponding the port values in the port number sequence in order, thereby accelerating the link connection to the target.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A network communication system, comprising:
a link server, located in an Internet;
a first address translator, configured to form a first local network and have a first external network address, wherein the first address translator comprises a first internal port and at least one first external port, the first internal port is connected to the Internet via one of the at least one first external port, and each of the at least one first external port has a first external port number;
a second address translator, configured to form a second local network and have a second external network address, wherein the second address translator comprises a second internal port and a plurality of second external ports, the second internal port is connected to the Internet via one of the plurality of second external ports, and each of the plurality of second external ports has a second external port number;
a first network device, located in the first local network, coupled to the first internal port, configured to be connected to the first external port via the first internal port and be connected to the link server via the first external port; and
a second network device, located in the second local network, coupled to the second internal port, configured to be connected to one of the second external port via the second internal port and be connected to the link server via the second external port;
wherein when the first network device is connected to the link server via the first external port, the link server stores the first external network address corresponding to the first network device and the first external port number corresponding to the first external port, and when the second network device is connected to the link server via the second external port, the link server stores the second external network address corresponding to the second network device and the second external port number corresponding to the second external port;
wherein when the first network device obtains the second external network address and the second external port number from the link server, the first network device generates a port number sequence with a plurality of port values according to the second external port number, and sends a first link packet to the second external network address in order of the plurality of port values in the port number sequence until the first network device receives a first acknowledgement packet from the second network device, resulting from the second network device receives the first link packet via at least one of the plurality of second external ports;
wherein each of the at least one second external port receiving the first link packet corresponds to one of the plurality of port values;
wherein at least one of the plurality of port values is related to the second external port number, a part of the plurality of port values are generated by gradual based on the second external port number, and the rest of the plurality of port values are generated randomly; and
wherein total number of the plurality of port values in the port number sequence is less than the number of request times for determining the link connection belongs to cyber attacks.

2. The network communication system according to claim 1, after the second network device obtains the first external network address and the first external port number from the link server, the second network device controls the second address translator to open some of the plurality of second external ports, and sends a second link packet one by one via some of the plurality of second external ports to the first external network address according to the first external port number until the second network device receives a second acknowledgement packet from the first network device via one of the plurality of second external ports, resulting from the first address translator receives the second link packet via the first external port corresponding to the first external port number.

3. The network communication system according to claim 1, wherein when the first network device receives the first acknowledgement packet and the second network device receives the second acknowledgement packet, a link connection between the first network device and the second network device is established.

4. The network communication system according to claim 1, wherein the total number is between 912 and 1024.

5. The network communication system according to claim 1, wherein the number of the rest port values generated randomly is larger than or equal to a quarter of total number of the plurality of port values in the port number sequence.

6. The network communication system according to claim 5, wherein (4k+3)th port value and (4k+4)th port value in the port number sequence are generated randomly, and the k is an integer less than a quarter of the total number of the plurality of port values in the port number sequence but not less than 0 (zero).

7. The network communication system according to claim 1, wherein (4k+5)th port value in the port number sequence are generated by gradually increased, (4k+2)th port value in the port number sequence are generated by decrementing gradually, and the k is an integer less than a quarter of total number of the plurality of port values in the port number sequence but not less than 0 (zero).

8. The network communication system according to claim 1, wherein (4k+5)th port value in the port number sequence are generated by decrementing gradually, (4k+2)th port value in the port number sequence are generated by incrementing gradually, and the k is an integer less than a quarter of total number of the plurality of port values in the port number sequence but not less than 0 (zero).

9. The network communication system according to claim 1, wherein when the port value gradually generated based on the second external port number is less than 1024 or larger than 65535, the port value in the port number sequence is regenerated randomly.

10. The network communication system according to claim 1, wherein the first address translator is a second-type network address translator (NAT), and the second address translator is a symmetric NAT.

11. A network-traversal method comprising:
obtaining an address information of a network device from a link server, wherein the address information comprises an external network address of an address translator and an external port number of the address translator;

generating a port number sequence based on the external port number, wherein the port number sequence is comprised of a plurality of port values, one of the plurality of port values is the external port number, a part of remaining ones of the plurality of port values is generated gradually in order based on the external port number, and the rest of the remaining ones of the plurality of port values are generated randomly; and sending a link packet to the external network address in an order of the plurality of port values in the port number sequence until receiving an acknowledgement packet from the network device, wherein a total number of the plurality of port values in the port number sequence is less than the number of request times for determining the link connection belongs to cyber attacks.

12. The network-traversal method according to claim 11, wherein the total number is between 912 and 1024.

13. The network-traversal method according to claim 11, wherein the number of the rest port values generated randomly is larger than or equal to a quarter of a total number of the plurality of port values in the port number sequence.

14. The network-traversal method according to claim 13, wherein (4k+3)th port value and (4k+4)th port value in the port number sequence are generated randomly, and the k is an integer less than a quarter of the total number of the plurality of port values in the port number sequence but not less than 0 (zero).

15. The network-traversal method according to claim 11, wherein (4k+5)th port value in the port number sequence are generated by incrementing gradually, (4k+2)th port value in the port number sequence are generated by decrementing gradually, and the k is an integer less than a quarter of total number of the plurality of port values in the port number sequence but not less than 0 (zero).

16. The network-traversal method according to claim 11, wherein (4k+5)th port value in the port number sequence are generated by decrementing gradually, (4k+3)th port value in the port number sequence are generated by incrementing gradually, and the k is an integer less than a quarter of total number of the plurality of port values in the port number sequence but not less than 0 (zero).

17. The network-traversal method according to claim 11, wherein when in the port number sequence, the port value gradually generated based on the second external port number is less than 1024 or larger than 65535, the port value in the port number sequence is regenerated randomly.

18. The network-traversal method according to claim 11, wherein the address translator is a symmetric NAT.

* * * * *